(12) United States Patent
Tian et al.

(10) Patent No.: US 10,630,523 B2
(45) Date of Patent: Apr. 21, 2020

(54) CHANNEL ESTIMATION AND COMPENSATION IN HIGH SPEED SCENARIOS

(71) Applicant: Intel IP Corporation, Santa Clara, CA (US)

(72) Inventors: Shuang Tian, Santa Clara, CA (US); Yang Tang, Pleasanton, CA (US); Dae Jung Yoon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 15/170,712

(22) Filed: Jun. 1, 2016

(65) Prior Publication Data

US 2017/0099175 A1 Apr. 6, 2017

Related U.S. Application Data

(60) Provisional application No. 62/237,327, filed on Oct. 5, 2015, provisional application No. 62/295,928, filed on Feb. 16, 2016.

(51) Int. Cl.
*H04L 27/26* (2006.01)
*H04L 25/02* (2006.01)
*H04B 7/01* (2006.01)
*H04W 72/04* (2009.01)
*H04W 84/00* (2009.01)

(52) U.S. Cl.
CPC .......... *H04L 27/2646* (2013.01); *H04B 7/01* (2013.01); *H04L 25/0212* (2013.01); *H04L 25/0222* (2013.01); *H04L 25/0224* (2013.01); *H04L 27/261* (2013.01); *H04L 27/265* (2013.01); *H04L 27/2628* (2013.01); *H04L 27/2647* (2013.01); *H04L 27/2657* (2013.01); *H04W 72/042* (2013.01); *H04W 84/005* (2013.01); *H04L 27/2695* (2013.01)

(58) Field of Classification Search
CPC combination set(s) only.
See application file for complete search history.

(56) References Cited

U.S. PATENT DOCUMENTS

| | | | |
|---|---|---|---|
| 2005/0105647 A1 | 5/2005 | Wilhelmsson et al. | |
| 2009/0252211 A1 | 10/2009 | Wang | |
| 2010/0008452 A1 | 1/2010 | Ahn et al. | |
| 2011/0158343 A1 | 6/2011 | Park et al. | |

(Continued)

FOREIGN PATENT DOCUMENTS

| | | | | |
|---|---|---|---|---|
| KR | 101488787 B1 | 2/2015 | | |
| WO | WO-2016145778 A1 * | 9/2016 | ............... | H04B 7/08 |

OTHER PUBLICATIONS

Kim et al., Distributed Antenna System-based Millimeter-Wave Mobile Broadband Communication System for High Speed Trains, Wireless Transmission Research Department, ETRI (Year: 2013).*

(Continued)

*Primary Examiner* — Ian N Moore
*Assistant Examiner* — Justin T Van Roie
(74) *Attorney, Agent, or Firm* — Fish & Richardson P.C.

(57) ABSTRACT

Embodiments of the present disclosure describe systems, devices, and methods that may provide channel estimation and compensation in high speed scenarios, which may include user equipment carried on a high speed train. Embodiments may employ cell-specific reference signal (CRS)-based time-domain channel estimation and compensation.

20 Claims, 10 Drawing Sheets

(56) References Cited

U.S. PATENT DOCUMENTS

2012/0027140 A1* 2/2012 Weng .................. H04L 25/0232
375/350
2018/0020330 A1* 1/2018 Li ........................... H04B 7/08

OTHER PUBLICATIONS

International Search Report and Written Opinion for International Application No. PCT/US2016/049260 dated Nov. 28, 2016 ; 14 pages.

* cited by examiner

US 10,630,523 B2

CHANNEL ESTIMATION AND COMPENSATION IN HIGH SPEED SCENARIOS

RELATED APPLICATION

This application claims priority under 35 U.S.C. § 119 from provisional patent application No. 62/237,327, filed Oct. 5, 2015, and from provisional patent application No. 62/295,928, filed Feb. 16, 2016. The provisional patent applications are hereby incorporated by reference in their entireties.

TECHNICAL FIELD

Embodiments of the present disclosure generally relate to the field of wireless communication, and more particularly, to channel estimation and compensation in scenarios of high speed travel of user equipment (UE).

BACKGROUND

Wireless UEs in communication with a wireless network may be carried on vehicles that travel at high speeds, which may be greater than, for example, 160 km/hr. Such vehicles may include terrestrial or surface vehicles, such as high speed trains (HSTs), which may travel at speeds of more than 250 km/hr.

In connection with Long Term Evolution (LTE) Radio Access Network Working Group 4 (RAN4), a two-path remote radio head (RRH) single-frequency network (SFN) channel model for HST scenarios may enhance network performance for high speed scenarios. A challenge is to accurately estimate the two-path channel impulse response (CIR), which may include tap power, phase, time delay and/or Doppler shift of each path.

In channel estimation, known signals that are sometimes called pilot symbols or pilots may be transmitted along with data to obtain channel knowledge for proper decoding of received signals. Legacy channel estimation may be based on a minimum-mean-square-error (MMSE) linear Wiener filter. In some embodiments, a Doppler spread estimator may only estimate a maximum Doppler shift by using statistical methods. With Doppler spread modeled as a Jakes spectrum, for example, the estimator may employ curve fitting for a Bessel function. Such channel estimation may be suited to providing estimation of multipath fading channels, where there may be an arbitrary number of different paths in which each path may be characterized by an independently random Doppler shift with a probability density function (p.d.f.) distribution proportional to a Doppler power spectrum. However, such channel estimation may be inaccurate for high speed, two-path RRH SFN scenarios, which may arise in connection with HSTs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having,"

and "including" are synonymous, unless the context dictates otherwise. The phrases "A or B," "A/B," and "A and/or B" mean (A), (B), or (A and B).

Figure 1:
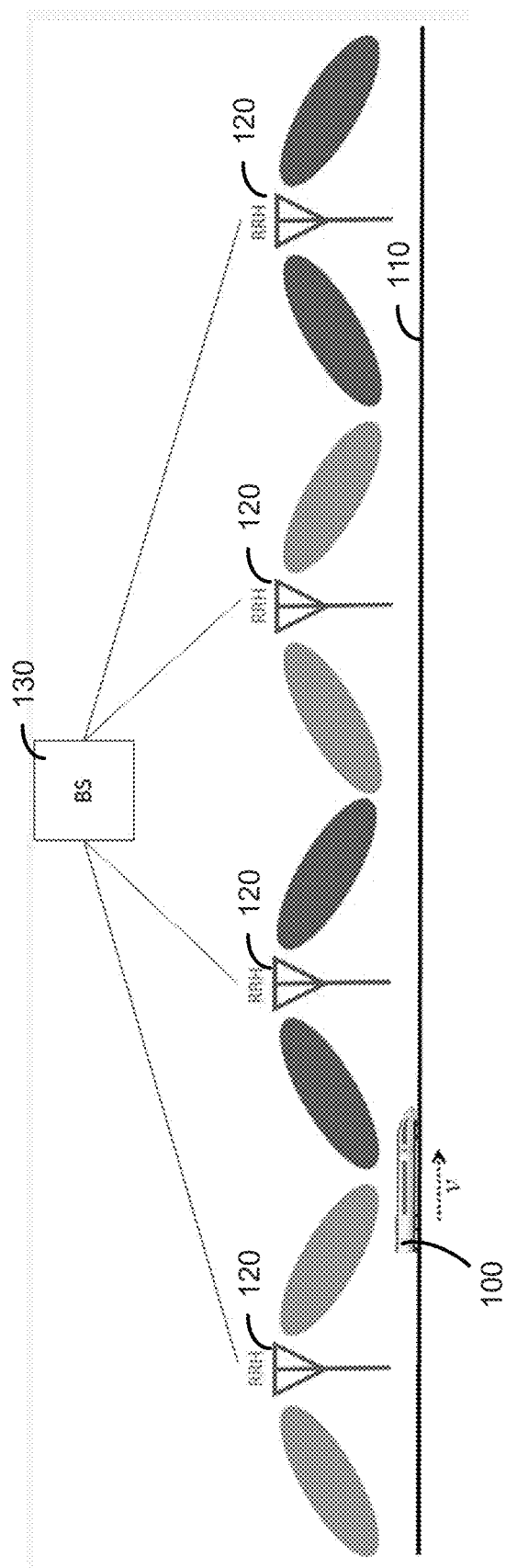
FIG. 1 is a diagram of an example operating environment in which systems and/or methods described herein may be implemented.

FIG. 1 is a diagram of an example operating environment in which systems and/or methods described herein may be implemented. As illustrated, the operating environment may include a high speed terrestrial travel scenario, such as an HST 100 that may travel at high speed along a track 110 along which may be positioned two or more remote radio heads (RRHs) 120 that each may be in communication with one or more base stations 130 (one shown). In embodiments, base station 130 may be or include an evolved Node B, for example. RRHs 120 may provide two-path wireless communication with one or more UEs or other wireless devices (not shown, hereinafter referred to as UEs), which may be carried on HST 100. RRHs 120 may provide two-path wireless communication with the one or more UEs on HST 100 in that RRHs 120 positioned along track 110 may be in wireless communication with the UEs generally from ahead or from behind HST 100. The one or more UEs that may be carried on HST 100 may be used by and/or under the control of individual users and/or may be used by and/or under the control of the HST 100 or equipment carried on or used by the HST 100.

Figure 2:
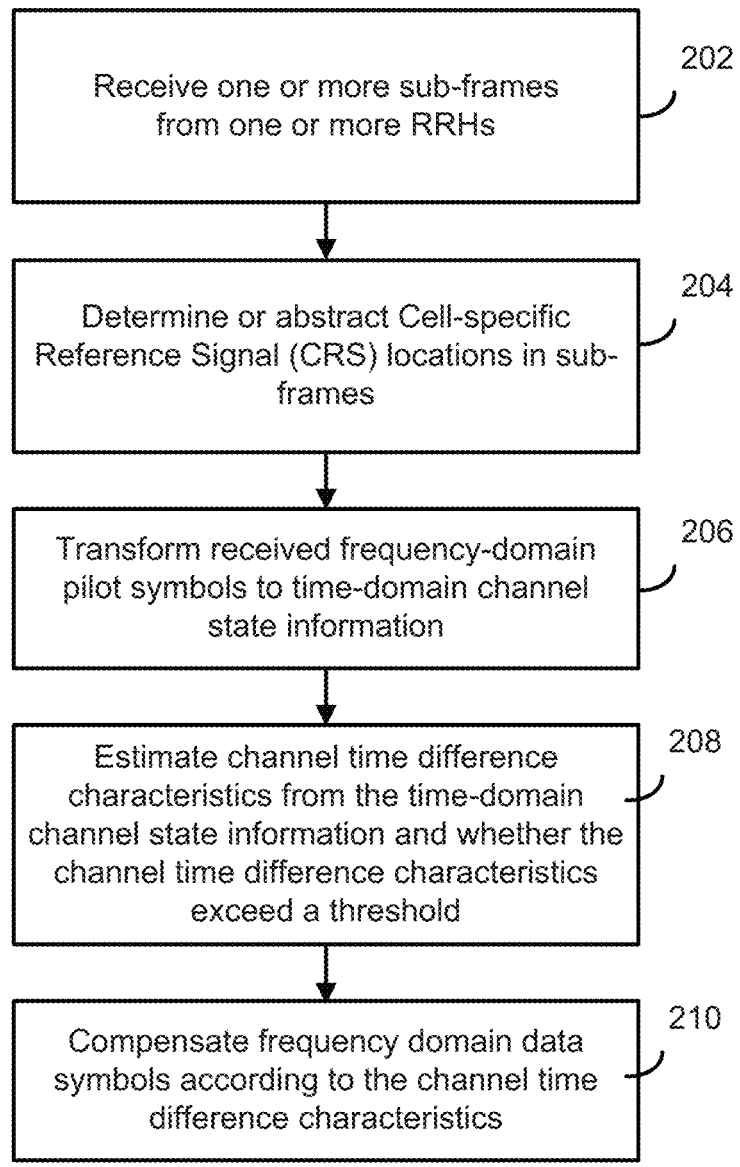
FIG. 2 is a flowchart describing operations of a UE that may be carried on an HST in accordance with some embodiments.

FIG. 2 is a flowchart describing operations of a UE that may be carried on HST 100 in accordance with some embodiments of channel estimation, for example.

At 202, the UE may receive one or more sub-frames of a wireless communication format from one or more RRHs.

At 204, the UE may determine or abstract one or more frequency-domain pilot symbols from one or more cell-specific reference signal (CRS) locations within the one or more sub-frames.

Figure 3:
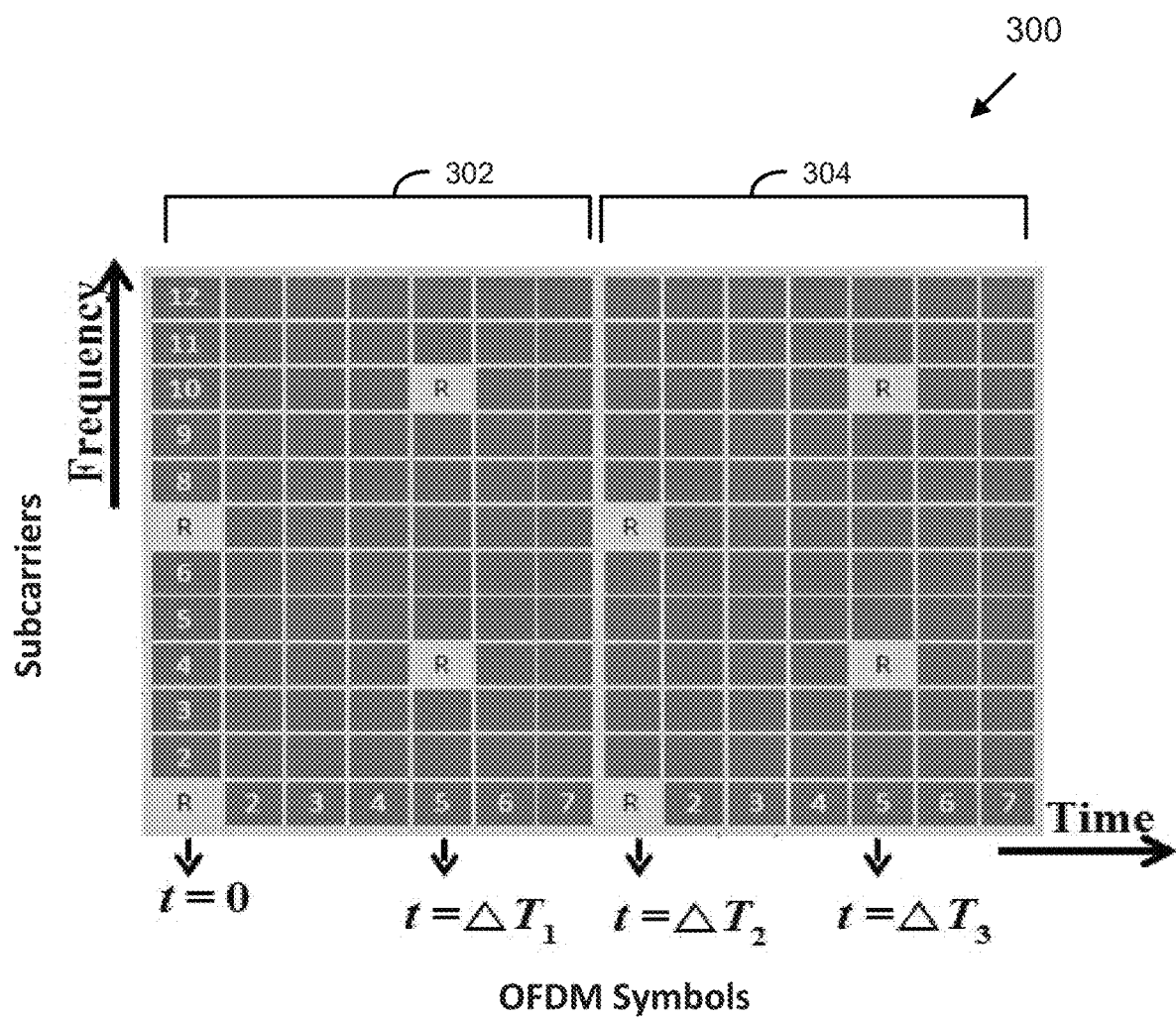
FIG. 3 illustrates a resource block of a sub-frame for a normal cyclic prefix 1×1 antenna system in accordance with some embodiments.

As an example embodiment, FIG. 3 illustrates a resource block (RB) 300 of a sub-frame for a normal cyclic prefix (CP) 1×1 antenna system, with the character "R" indicating CRS locations that may include frequency-domain pilot symbols. In the illustration of FIG. 3, RB 300 includes multiple resource elements (REs) 302, which are indicated by two 12×7 arrays of blocks that represent 168 REs 302 within RB 300. In frequency domain, each RE 302 may encompass 15 kHz of frequency, and in time domain, each RE 302 may encompass 1/15 kHz=66.67 uS of time.

A sub-frame may encompass multiple RBs 300 over a range of frequencies and, with reference to the illustration of FIG. 3, may be represented by the multiple RBs 300 arranged vertically over a range of frequencies. In embodiments, such as 10 MHz LTE, for example, a sub-frame may encompass 50 RBs 300 that may include in the frequency domain 50×12 or 600 subcarriers that may encompass a bandwidth of 600×15 kHz, or 9 MHz. One orthogonal frequency-division multiplexing (OFDM) symbol may correspond to one vertical column of 600 REs 302 of such a sub-frame. In time domain, the OFDM symbol may encompass 66.67 uS (e.g., without CP, like a guard interval), and in frequency domain, the OFDM may encompass 600 subcarriers. As a result, one sub-frame may encompass 14 OFDM symbols, each of 66.67 uS in time domain, so that the sub-frame may have a duration of at least 0.9334 mS (14×66.67 uS). In embodiments, the sub-frame may have a duration of 1 mS with inclusion of a time domain guard interval-cyclic prefix.

In embodiments, resource block 300 may include two slots 304 and 306, each of which may include portions of seven sequential OFDM symbols that may be numbered 1-7. In embodiments, the CRSs may be carried on the first and fifth OFDM symbols of each of slots 304 and 306, as illustrated, and five subcarriers (e.g., subcarriers 2-6 inclusive or subcarriers 5-9 inclusive) may be included between the CRSs of each OFDM symbol for data transmission. For example, the OFDM symbols that carry CRSs may be indicated as the 1st and 5th OFDM symbols occurring at times that may be indicated as t=0, $\Delta T1$, $\Delta T2$, . . . . A sub-frame with 50 RBs 300 may include, therefore, 100 frequency-domain pilot symbols on each of the 1st and 5th OFDM symbols.

Returning to FIG. 2, at 206, the UE may transform the frequency-domain pilot symbols to time-domain channel state information. In embodiments, the frequency-domain pilot symbols may be transformed to time-domain channel state information by inverse fast Fourier transform (IFFT) and may provide an estimation of time-domain CIR, as described below in greater detail.

At 208, the UE may estimate channel time difference characteristics from the time-domain channel state information and whether the channel time difference characteristics exceed a threshold. In embodiments, the channel time difference characteristics may include any or all of a determination of a Doppler shift within one or more sub-frames, a determination of a time delay within the one or more sub-frames, and/or a determination of a tap power within the one or more sub-frames.

Determining whether the channel time difference characteristics exceed a threshold may in some embodiments include a determination whether a Doppler shift within one or more sub-frames includes substantially opposite first and second Doppler shifts of a selected threshold. In embodiments, the substantially opposite first and second Doppler shifts of the selected threshold may arise, for example, with regard to the UE carried on the HST 100 at high speed receiving sub-frames from RRHs 120 positioned along track 110 ahead of and behind HST 100.

At 210, the UE may compensate frequency domain data symbols according to the channel time difference characteristics, if the channel time difference characteristics exceed the threshold.

In embodiments, operations of FIG. 2 may be employed in a system that may include a 10 MHz bandwidth and may employ FFT/IFFT operations and/or a FFT/IFFT module with a size of 1024 bins per analysis window, such as in some LTE systems. In embodiments, the time domain representation of an OFDM symbol may include 1024 samples in time sequence x(t), t from 0 to 1023, in which x(t) may be complex values. The frequency domain representation of an OFDM symbol may include 1024 samples, and each sample may "sit on" or correspond to one subcarrier, in frequency sequence X(k), k from 0 to 1023. In other embodiments, k may have index values from −512 to 511, where index "0" may refer to "direct current (DC)". For example, "subcarrier 0" may be set to "0" value, while the other X(k) may be random complex data values for transmission, and x(t) and X(K) may correspond to each other by FFT/IFFT operations such that, for example: X(k)=FFT[x(t)]⇔x(t)=IFFT[X(k)]. Each subcarrier may encompass 15 kHz, so a full-size FFT/IFFT may use a frequency band of 15 kHz×1024=15.36 MHz. Some embodiments may employ, for example, a middle 600 subcarriers (e.g., indexed −300 to −1 and 1 to 300) for an LTE 10 MHz system, and remaining subcarriers may be set to 0.

Figure 4:
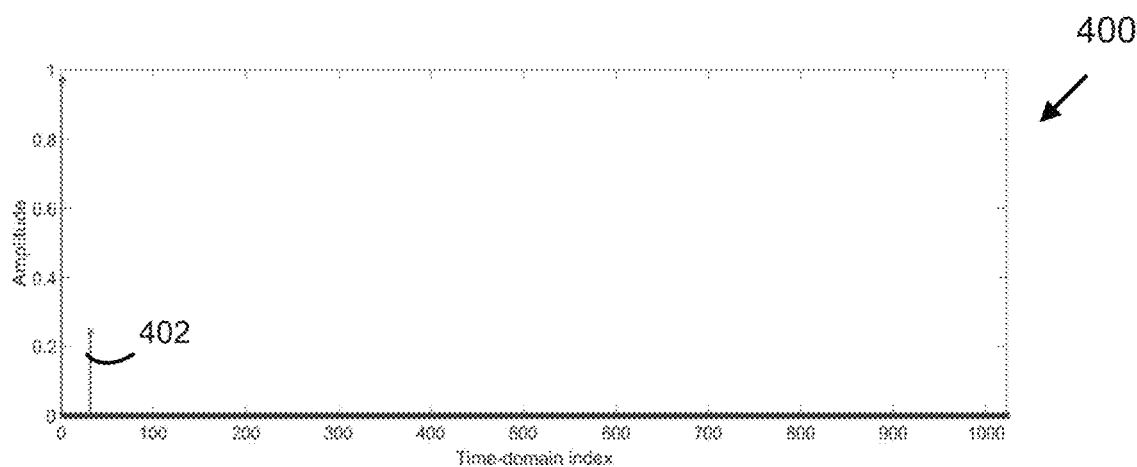
FIG. 4 is a graph illustrating relative amplitude by time-domain index for a sample real channel impulse response (CIR) in time-domain in accordance with some embodiments.
Figure 5:
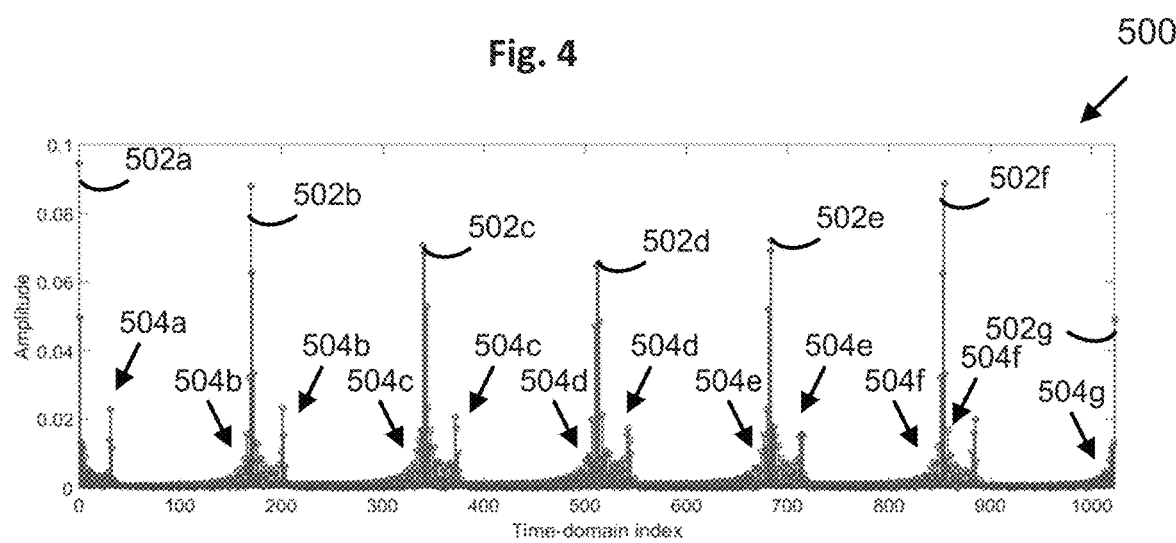
FIG. 5 is a graph illustrating relative amplitude by time-domain index for a sample cell-specific reference signal-based inverse fast Fourier transform (IFFT) output representing the time-domain CIR of FIG. 4 in accordance with some embodiments.
Figure 6:
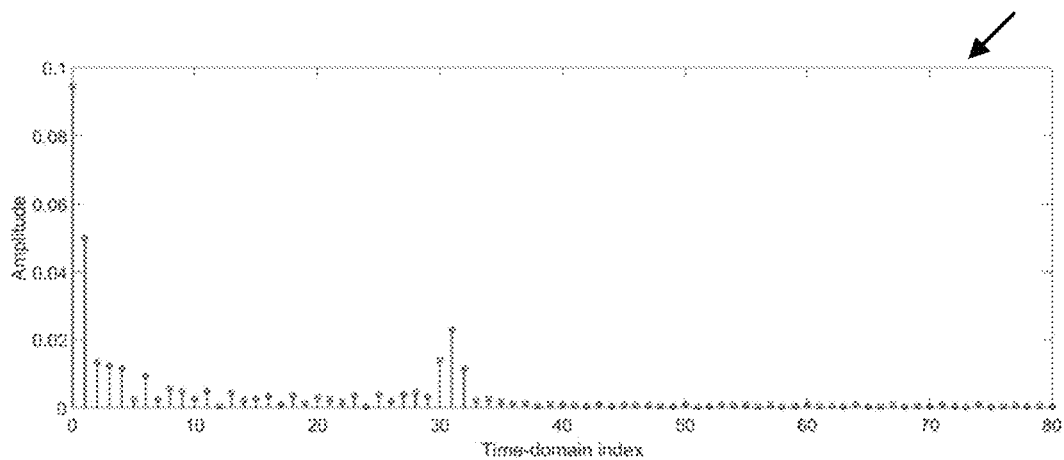
FIG. 6 is a graph illustrating relative amplitude by time-domain index for example IFFT output samples that may represent the CIR of FIG. 4 with fewer than all samples of an IFFT/FFT operation in accordance with some embodiments.

For example, FIG. 4 is a graph 400 illustrating relative amplitude by time-domain index for a sample real channel impulse response (CIR) in time-domain, wherein the CIR may be indicated by a signal peak 402. FIG. 5 is a graph 500 illustrating relative amplitude by time-domain index for a sample CRS-based IFFT output representing the time-domain CIR of FIG. 4. The IFFT output illustrated in FIG. 5 may include repetitions and may be contaminated by additive white Gaussian noise (AWGN) and may include major, maximum, or central signal peaks 502a-502g and smaller side-peaks 504a-504g that may be due to windowing effects of IFFT/FFT operations, for example. In embodiments with a period length of cyclic prefix (CP) that is long enough to cover a maximum time delay, in a normal CP system, a real CIR may be represented by fewer than all IFFT samples, for example. FIG. 6 is a graph 600 illustrating relative amplitude by time-domain index for example IFFT output samples that may represent the real CIR of FIG. 4 with fewer than all 1024 samples of an IFFT/FFT operation with a size of 1024. In an embodiment corresponding to FIG. 6, an initial 80 IFFT output samples may represent the real CIR of FIG. 4. As shown in FIG. 6, relative contributions of IFFT output samples after the initial 40 are relatively minimal.

In traveling between RRHs 120 along track 110, HST 100 may be relatively close to one RRH 120 and far from another RRH 120. In this circumstance, the two taps representing the two paths from the two RRHs 120 may have significant or large differences in power and may be far apart in time. The two clusters of side-peaks in this circumstance may not overlap with each other, as is illustrated by graph 500 in FIG. 5, for example. In this circumstance it may be straightforward to identify a maximum peak in each cluster as the real CIR tap. However, when HST 100 is traveling near the midpoint equidistant between two RRHs 120, the two real CIR taps may be of similar power and may arrive at almost the same time such that the two clusters of peaks could mix with each other and make it difficult to identify the real CIR taps.

Figure 7:
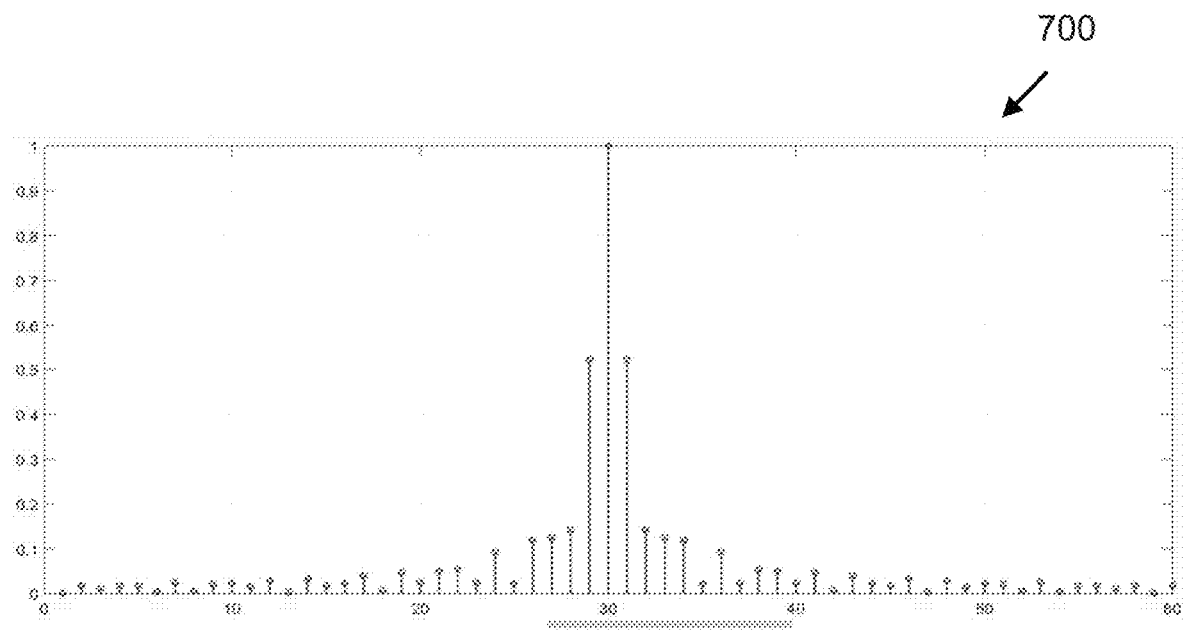
FIG. 7 is a graph illustrating correlation of a side-peak and a center peak in accordance with some embodiments.
Figure 8:
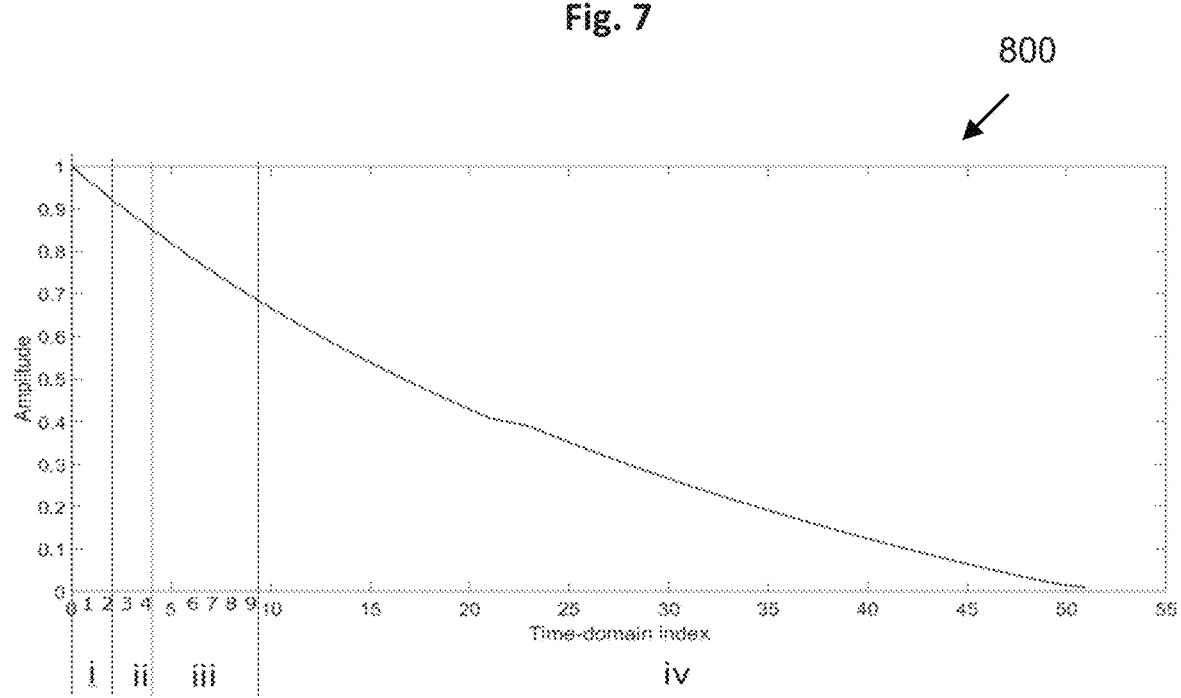
FIG. 8 is a graph illustrating an example of decay of tap amplitude over time delay in accordance with some embodiments.

In embodiments, a correlation of a side-peak and a center-peak may be expressed by a Sinc function as:

$$X(m) = e^{j(2\pi m/N)(n_0-(K-1)/2)} \cdot \frac{\sin(\pi mK/N)}{\sin(\pi m/N)} \quad (A)$$

where m is a time-index, N is the size of FFT/IFFT, $n_0$ is a starting index of a window function, and K is a window length in frequency domain. In embodiments, such as 10 MHz LTE system for example, correlation of a side-peak and a center-peak may be illustrated by graph 700 of FIG. 7 and may correspond to the following sampling of values, with sample location 30 corresponding to the value of M and successive sample locations proceeding therefrom:

$a(M)=1;$ $a(M-1)=0.5214 \cdot e^{-i \cdot 0.0153}; \; a(M+1)=0.5214 \cdot e^{+i \cdot 0.0153};$ $a(M-2)=0.1428 \cdot e^{+i \cdot 3.1109}; \; a(M+2)=0.1428 \cdot e^{i-3.1109};$ $a(M-3)=0.1254 \cdot e^{+i \cdot 3.0956}; \; a(M+3)=0.1254 \cdot e^{-i \cdot 3.0956};$ $a(M-4)=0.119 \cdot e^{-i \cdot 0.0614}; \; a(M+4)=0.01190 \cdot e^{+i \cdot 0.0614};$ $a(M-5)=0.0205 \cdot e^{-i \cdot 0.0767}; \; a(M+5)=0.0205 \cdot e^{+i \cdot 0.0767};$ $a(M-6)=0.0922 \cdot e^{+i \cdot 3.0496}; \; a(M+6)=0.0922 \cdot e^{-i \cdot 3.0496}; \quad (B)$ In an embodiment, identifying two real CIR taps, or where they are located, may include dividing an initial set of IFFT output samples (e.g. an initial 80 IFFT output samples) into multiple regions or groups. As an example, FIG. 8 is a graph 800 illustrating an example of decay of tap amplitude over time delay (in IFFT samples) for a sample SFN scenario in which two RRHs 120 may be 1000 m apart. FIG. 8 shows four regions:

Region i: delay of 1 to 2 samples;
Region ii: delay of 3 to 4 samples;
Region iii: delay of 5 to 9 samples;
Region iv: delay>=10 samples.

For example, the amplitudes of IFFT output samples may be expressed as h'(m), where m represents the time-domain index, and timing offset may be deemed corrected, and the value of h'(0) could be large and represent a first arriving path. The peak selection task may then make a determination of where a weaker second arriving path is located. (If there is timing offset, an additional search for a stronger first arriving path may be needed.)

Figure 9:
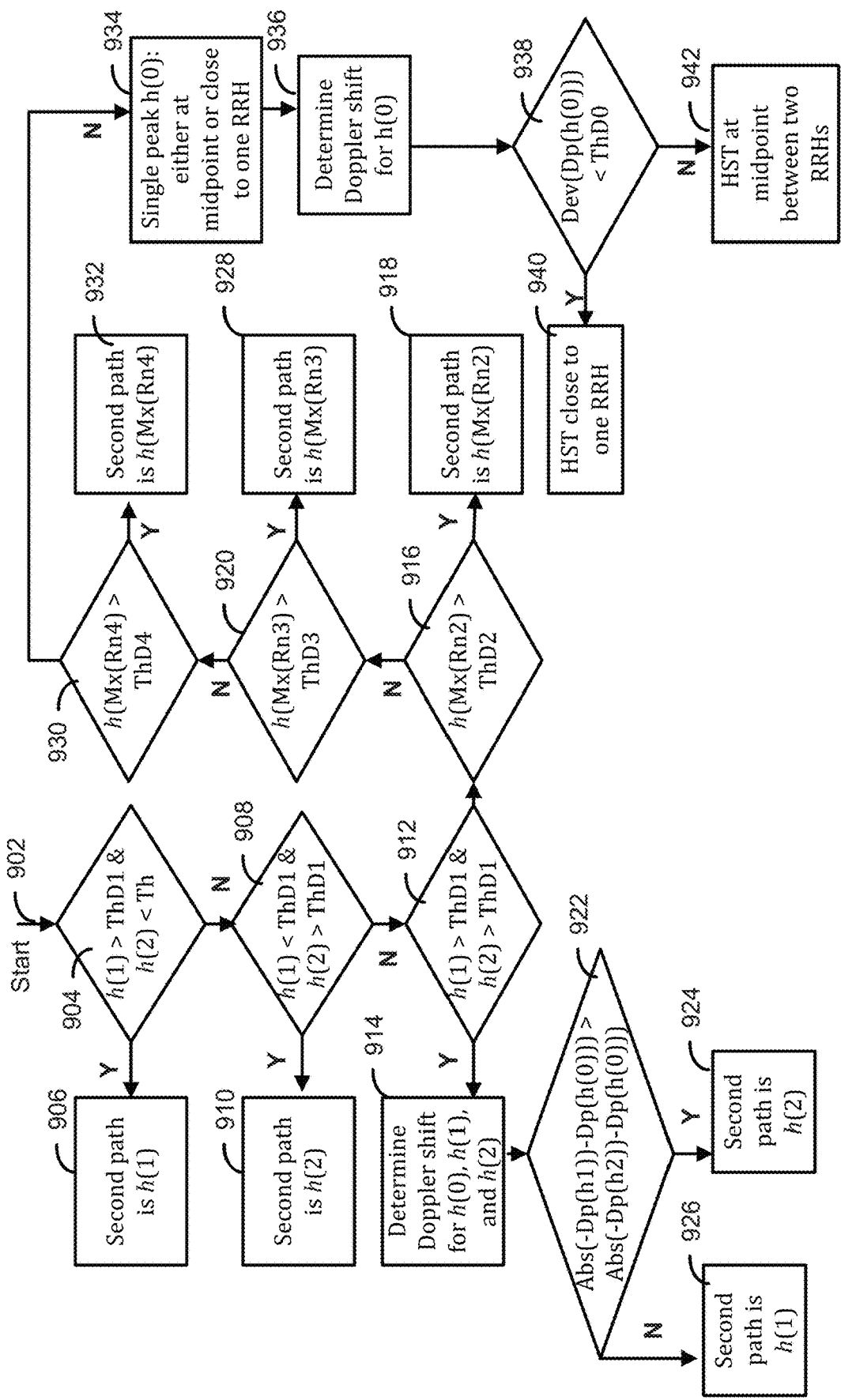
FIG. 9 is a flow chart illustrating an embodiment of peak selection in accordance with some embodiments.

FIG. 9 is a flow chart illustrating an embodiment of peak selection. In embodiments, each region i may be associated with a decision threshold (ThDi) based on a value of h'(0), wherein:

Region i: delay of 1 to 2 samples; ThD1=0.72×h'(0);
Region ii: delay of 3 to 4 samples; ThD2=0.68×h'(0);
Region iii: delay of 5 to 9 samples; ThD3=0.30×h'(0);
Region iv: delay>=10 samples; ThD4=0.10×h'(0).

In the flow chart of FIG. 9, the calculation and comparison of h(m) may incorporate correlation values a(Δm) of Eq. (B). Correlation-adjusted h(0), for example, may be given by:

$$h(0)=[h'(0)-a(1)\times h'(1)]/[1-a(-1)\times a(1)]. \quad (C)$$

In FIG. 9, Dp(h(m)) may denote Doppler shift for h(m), which may be determined by estimating a speed of phase rotation across various CRS-embedded OFDM symbols. Mx(Rni) may denote a time index 'm' that may give a maximum amplitude of h(m) in region 'i'. Dev(x) may denote deviation of x.

At 902, peak selection may start.
At 904, a determination is made whether h(1)>ThD1 and h(2)<ThD1. If yes, proceed to 906. If no, proceed to 908.
At 906, a second path is indicated by h(1).
At 908, a determination is made whether h(1)<ThD1 and h(2)>ThD1. If yes, proceed to 910. If no, proceed to 912.
At 910, a second path is denoted h(2).
At 912, a determination is made whether h(1)>ThD1 and h(2)>ThD1. If yes, proceed to 914. If no, proceed to 916.
At 914, determine Doppler shift for h(0), h(1), and h(2).
At 916, a determination is made whether h(Mx(Rn2))>ThD2. If yes, proceed to 918. If no, proceed to 920.
At 922, a determination is made with regard to the absolute value (Abs) whether Abs(-Dp(h1))-Dp(h(0)))>Abs(-Dp(h2))-Dp(h(0))). If yes, proceed to 924. If no, proceed to 926.
At 924, a second path is indicated by h(2).
At 926, a second path is indicated by h(1).
At 918, a second path is indicated by h(Mx(Rn2)).
At 920, a determination is made whether h(Mx(Rn3))>ThD3. If yes, proceed to 928. If no, proceed to 930.
At 928, a second path is indicated by h(Mx(Rn3)).
At 930, a determination is made whether h(Mx(Rn4))>ThD4. If yes, proceed to 932. If no, proceed to 934.
At 932, a second path is indicated by h(Mx(Rn4)).
At 934, a single peak h(0) is indicated, either at or near midpoint between two RRHs or close to one RRH.
At 936, determine Doppler shift for h(0).
At 938, a determination is made whether Dev(Dp(h(0)))<ThD0. If yes, proceed to 940. If no, proceed to 942.
At 940, HST is close to one RRH.
At 942, HST at or near midpoint between two RRHs.

As illustrated, for example, h(1)>ThD1 and h(2)>ThD1 may imply that the HST 100 may be traveling near a midpoint equidistant between two RRHs 120. In this circumstance, Doppler shifts for h(1) and h(2) may be calculated and the one with the opposite Doppler shift to h(0) may be chosen as the tap of the second path.

Moreover, if the peak selection proceeds to region iv and results in h(Mx(Rn4))<ThD4, there may be only one distinguishable cluster of peaks for the IFFT output. This may mean that the HST is either traveling at or near the midpoint equidistant between two RRHs 120 with the two paths arriving at the same time, or that the train is very close to one RRH and the path from the far RRH is so weak that it is negligible. In this case, the deviation of the Doppler shift of h(0) may be used to decide where the HST 100 is traveling. If the HST 100 is very close to one RRH 120, h(0) may represent the only one detectable CIR peak and the deviation of Doppler shift may small. Once the position of the second CIR tap is determined, the side-peaks may be removed to obtain a clear two-path CIR, as shown in FIG. 4.

CIR Estimation

With regard to frequency-domain pilot symbols (e.g., 100 pilot symbols) that may be determined or abstracted from one or more cell-specific reference signal (CRS) locations within the one or more sub-frames, as referenced at 204, time-domain CIR representations for pilot symbols at times t=0, $\Delta T1$, $\Delta T2$, . . . may be expressed by IFFT as:

For t=0, the time-domain CIR representation can be expressed as:

$$h_{t=0} = (\alpha_1 + j \cdot \beta_1) \cdot e^{j \cdot 2\pi \cdot f_1 \cdot 0} \cdot \delta(\tau - \tau_1) + (\alpha_2 + j \cdot \beta_2) \cdot e^{j \cdot 2\pi \cdot f_2 \cdot 0} \cdot \delta(\tau - \tau_2), \quad (1)$$

For t=$\Delta T_1$, the time-domain CIR representation can be expressed as:

$$h_{t=\Delta T_1} = (\alpha_1 + j \cdot \beta_1) \cdot e^{j \cdot 2\pi f_1 \cdot \Delta T_1} \cdot \delta(\tau - \tau_1) + (\alpha_2 + j \cdot \beta_2) \cdot e^{j \cdot 2\pi f_2 \cdot \Delta T_1} \cdot \delta(\tau - \tau_2). \quad (2)$$

For t=$\Delta T_2$, the time-domain CIR representation can be expressed as:

$$h_{t=\Delta T_2} = (\alpha_1 + j \cdot \beta_1) \cdot e^{j \cdot 2\pi f_1 \cdot \Delta T_2} \cdot \delta(\tau - \tau_1) + (\alpha_2 + j \cdot \beta_2) \cdot e^{j \cdot 2\pi f_2 \cdot \Delta T_2} \cdot \delta(\tau - \tau_2) \quad (3)$$

In these expressions, ($\alpha_i, j \cdot \beta_i$) may represent complex tap values of the CRS-embedded OFDM symbols and may provide Doppler shift, power, and/or phase information.

Doppler Shift

In one embodiment, Doppler shifts $f_1$ and $f_2$ may be determined from Eqs. (1)-(3) by, for example, dividing and determining means of time-domain CIR representations (e.g., IFFT output) at times t=$\tau_1$ and $\tau_2$, respectively, over different OFDM symbols, as indicated by equations (4) and (5):

$$f_1 = \text{mean}\left[\frac{\text{angle}\left(\frac{(\alpha_1 + j \cdot \beta_1) \cdot e^{j \cdot 2\pi \cdot f_1 \cdot \Delta T_1}}{(\alpha_1 + j \cdot \beta_1)}\right)}{2\pi \cdot \Delta T_1}, \frac{\text{angle}\left(\frac{(\alpha_1 + j \cdot \beta_1) \cdot e^{j \cdot 2\pi \cdot f_1 \cdot \Delta T_2}}{(\alpha_1 + j \cdot \beta_1) \cdot e^{j \cdot 2\pi \cdot f_1 \cdot \Delta T_1}}\right)}{2\pi \cdot (\Delta T_2 - \Delta T_1)}, \ldots\right] \quad (4)$$

$$f_2 = \text{mean}\left[\frac{\text{angle}\left(\frac{(\alpha_2 + j \cdot \beta_2) \cdot e^{j \cdot 2\pi \cdot f_2 \cdot \Delta T_1}}{(\alpha_2 + j \cdot \beta_2)}\right)}{2\pi \cdot \Delta T_1}, \frac{\text{angle}\left(\frac{(\alpha_2 + j \cdot \beta_2) \cdot e^{j \cdot 2\pi \cdot f_2 \cdot \Delta T_2}}{(\alpha_2 + j \cdot \beta_2) \cdot e^{j \cdot 2\pi \cdot f_2 \cdot \Delta T_1}}\right)}{2\pi \cdot (\Delta T_2 - \Delta T_1)}, \ldots\right] \quad (5)$$

Given a complex value x, angle(x) may refer to the angle of x, which may be in radians. For example, with x=1+j, angle(x) is $\pi/4$.

In another embodiment, Doppler shifts $f_1$ and $f_2$ that best fit a two-path channel model may be determined with a non-linear MMSE estimator. In this embodiment, a frequency $f_d$ may be quantized by a pre-defined set of discrete frequencies in which $f_{dmax}$ be a maximum Doppler shift, such as $$[-f_{dmax}, -f_{dmax} + \Delta f, -f_{dmax} + 2\Delta f, \ldots, +f_{dmax} - 2\Delta f, +f_{dmax} - \Delta f, +f_{dmax}].$$

Tap values in Eqs. (1)-(3) may be rotated by certain phases according to $f_{d1}$ and $f_{d2}$, which may be included in the pre-defined set of discrete frequencies and may be given by:

$$h^0_{t=0, f_{d1}, f_{d2}} = (\alpha_1 + j + \beta_1) \cdot \delta(\tau - \tau_1) + (\alpha_2 + j \cdot \beta_2) \cdot \delta(\tau - \tau_2), \quad (6)$$

$$h^0_{t=\Delta T_1, f_{d1}, f_{d2}} = (\alpha_1 + j \cdot \beta_1) \cdot e^{j \cdot 2\pi \cdot f_1 \cdot \Delta T_1} \cdot e^{-j \cdot 2\pi \cdot f_{d1} \cdot \Delta T_1} \cdot \delta(\tau - \tau_1) + \quad (7)$$
$$(\alpha_2 + j \cdot \beta_2) \cdot e^{j \cdot 2\pi \cdot f_2 \cdot \Delta T_1} \cdot e^{-j \cdot 2\pi \cdot f_{d2} \cdot \Delta T_1} \cdot \delta(\tau - \tau_2),$$

$$h^0_{t=\Delta T_2, f_{d1}, f_{d2}} = (\alpha_1 + j \cdot \beta_1) \cdot e^{j \cdot 2\pi \cdot f_1 \cdot \Delta T_2} \cdot e^{-j \cdot 2\pi \cdot f_{d1} \cdot \Delta T_2} \cdot \delta(\tau - \tau_1) + \quad (8)$$
$$(\alpha_2 + j \cdot \beta_2) \cdot e^{j \cdot 2\pi \cdot f_2 \cdot \Delta T_2} \cdot e^{-j \cdot 2\pi \cdot f_{d2} \cdot \Delta T_2} \cdot \delta(\tau - \tau_2).$$

Rotating the tap values by certain phases may have the effect that, when the $h_t$ in Eq. (6)-(8) are aligned or almost aligned with each other by rotating certain phases, the frequency coefficient "f" used for the rotating may be the desired Doppler shift estimate, and this "f" may also be the solution to Eq. (9).

Complex tap values and phases can be derived by determining a mean value of h(t) in Eqs. (6)-(8) at times t=$\tau_1$ and $\tau_2$ respectively. The frequencies $f_{d1}$ and $f_{d2}$ that give a minimum square error may correspond to the Doppler shift estimates $\hat{f}_1$ and $\hat{f}_2$, i.e.

$$\{\hat{f}_1 \cdot \hat{f}_1\} = \underset{f_{d1}, f_{d2}}{\arg\min}\{\text{var}(h_{t, f_{d1}, f_{d2}})\}. \quad (9)$$

In general, this operation may be of combinatorial complexity. However, in the HST scenario, where Doppler shifts are equal and opposite (i.e., $f_2 = -f_1$), the searching operation can be greatly simplified and may be reduced to linear complexity.

Another embodiment of determining Doppler shifts $f_1$ and $f_2$ may arise when the two paths arrive at a UE at the same time, such as when the HST 100 is traveling at about a midpoint equally or equidistant between two RRHs 120. This may be a relatively difficult and/or detrimental scenario because the UE may see the two channel taps as one major tap from the output of IFFT, which may have a common time delay $\tau_0$ that can be expressed as:

For t=0, $$h_{t=0} = [(\alpha_1 + j \cdot \beta_1) \cdot e^{j \cdot 2\pi \cdot f_1 \cdot 0} + (\alpha_2 + j \cdot \beta_2) \cdot e^{j \cdot 2\pi \cdot f_2 \cdot 0}] \cdot \delta(\tau - \tau_0). \quad (10)$$

For t=$\Delta T_1$, $$h_{t=\Delta T_1} = [(\alpha_1 + j \cdot \beta_1) \cdot e^{j \cdot 2\pi \cdot f_1 \cdot \Delta T_1} + (\alpha_2 + j \cdot \beta_2) \cdot e^{j \cdot 2\pi \cdot f_2 \cdot \Delta T_1}] \cdot \delta(\tau - \tau_0). \quad (11)$$

For t=$\Delta T_2$, $$h_{t=\Delta T_2}=[(\alpha_1+j\cdot\beta_1)\cdot e^{j\cdot 2\pi\cdot f1\cdot \Delta T1}+(\alpha_2+j\cdot\beta_2)\cdot e^{j\cdot 2\pi\cdot f2\cdot \Delta T1}]\cdot \delta(\tau-\tau_0).\qquad(12)$$

The next OFDM symbol with CRS pilots, for t=$\Delta T_3$, may provide:

$$h_{t=\Delta T_1}=[(\alpha_1+j\cdot\beta_1)\cdot e^{j\cdot 2\pi\cdot f1\cdot \Delta T3}+(\alpha_2+j\cdot\beta_2)\cdot e^{j\cdot 2\pi\cdot f2\cdot \Delta T_3}]\cdot \delta(\tau-\tau_0).\qquad(13)$$

As a result, these four Eqs. (10)-(13) have four unknown factors to estimate, namely $f_1$ and $f_2$, and two complex tap values $(\alpha_1+j\cdot\beta_1)$ and $(\alpha_2+j\cdot\beta_2)$.

One embodiment may include directly solving these four equations for the four factors. Another embodiment may employ the embodiment that uses equations (6)-(8) to estimate the four factors. For example, the HST 100 may be estimated to be travelling at the midpoint equidistant between two RRHs 120, which may approximately provide that $f_2=-f_1$. Then, with regard to one or more OFDM symbols with CRS pilots at time or times t=$\Delta T_i$:

$$h_{t=\Delta T_1}=[(\alpha_1+j\cdot\beta_1)\cdot e^{j\cdot 2\pi\cdot f1\cdot \Delta T1}+(\alpha_2+j\cdot\beta_2)\cdot e^{j\cdot 2\pi\cdot f2\cdot \Delta T1}]\cdot \delta(\tau-\tau_0)\qquad(14)$$

Given $f_{d1} \in [-f_{dmax}, -f_{dmax}+\Delta f, \ldots, +f_{dmax}-\Delta f, +f_{dmax}]$, the estimated $f_1$ may be expressed as:

$$f_1 = \underset{f_{d1}}{\mathrm{argmin}}\left\{\left|\frac{h_{t=\Delta T_i}\cdot e^{-j\cdot 2\pi\cdot f_{d1}\cdot\Delta T_i}-h_{t=\Delta T_j}\cdot e^{-j\cdot 2\pi\cdot f_{d1}\cdot\Delta T_j}}{h_{t=\Delta T_k}\cdot e^{-j\cdot 2\pi\cdot f_{d1}\cdot\Delta T_k}-h_{t=\Delta T_l}\cdot e^{-j\cdot 2\pi\cdot f_{d1}\cdot\Delta T_l}}\right|-1\right\}\qquad(15)$$

Where, $$\Delta T_i = \Delta T_k + \Delta T$$

$$\Delta T_j = \Delta T_l + \Delta T$$

$$\Delta T \neq 0$$

And the estimated $f_2$ may be $-\hat{f}_1$.

In an embodiment, a penultimate minimized value of the inner estimation function of h(t) may be used to identify $f_2$, such as for channel models where $f_2 \neq -f_1$. Moreover, more robust estimation may be provided with more or additional CRS-embedded OFDM symbols. Estimations of $f_1$ and $f_2$ with minimum summation or variance of a series of the inner estimation function in Eq. (15) may have greater accuracy.

Channel Compensation

With determination of the Doppler shifts $f_1$ and $f_2$, complex tap values and phases may be determined. In embodiments, complex tap values (e.g., $(\alpha_1+j\cdot\beta_1)$ and $(\alpha_2+j\cdot\beta_2)$) in Eqs. (1)-(3) and/or in Eqs. (10)-(14) can be determined by solving equations of h(t) and averaging over multiple time positions. Accordingly, for an OFDM symbol at an arbitrary time position t=$\Delta T$, the CIR representation may be given by:

$$h_{t=\Delta T}=(\alpha_1+j\cdot\beta_1)\cdot e^{j\cdot 2\pi\cdot f1\Delta T}\cdot \delta(\tau-\tau_1)+(\alpha_2+j\cdot\beta_2)\cdot e^{j\cdot 2\pi\cdot f2\cdot\Delta T}\cdot \delta(\tau-\tau_2).\qquad(16)$$

An FFT operation and interpolation by appending zeros following a derived time-domain CIR sample may be applied for channel compensation for any arbitrary frequency-domain subcarriers and for data demodulation, as at 210 in FIG. 2. Alternatively, the channel compensation can be conducted by applying corresponding phase rotation factors directly to arbitrary frequency-domain subcarriers of different OFDM symbols, once time-domain CIR samples are determined. For example, phase rotation factors may be applied directly to de-rotate the phase of arbitrary frequency-domain subcarriers of different OFDM symbols. As a result, channel compensation may provide improved and/or increased accuracy in channel estimation that may provide improved performance in HST travel scenarios.

Figure 10:
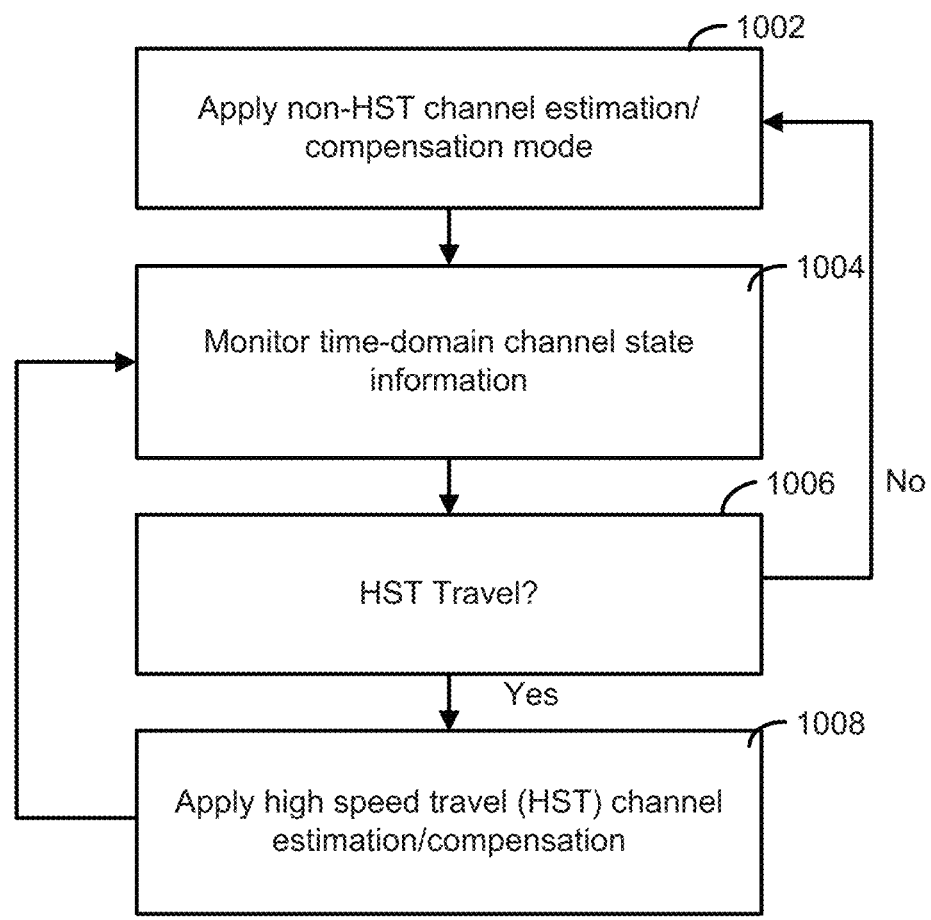
FIG. 10 is a flowchart describing operations of a UE that may be or may not be carried on an HST in accordance with some embodiments.

FIG. 10 is a flowchart 1000 describing operations of a UE that may be or may not be carried on HST 100 in accordance with some embodiments of channel estimation and compensation, for example.

At 1002, a UE may apply non-HST channel estimation/compensation in communication with a wireless network during non-HST travel. For example, non-HST channel estimation/compensation may employ MMSE linear Wiener filtering.

At 1004, the UE may monitor time-domain channel state information. In embodiments, monitoring time-domain channel state information may include periodically or constantly receiving and transforming frequency-domain pilot symbols to time-domain channel state information.

At 1006, the UE may determine from the time-domain channel state information whether the UE is undergoing HST travel. As described with reference to embodiments above, the UE may determine from the time-domain channel state information, including two clusters of peaks with center peaks, whether Doppler shifts are of at least a threshold amount and approximately opposite. If not, the UE may continue non-HST channel estimation/compensation at 1002. Otherwise, the UE may proceed to 1008.

At 1008, the UE may apply HST channel estimation and compensation. In embodiments, the HST channel estimation and compensation may include operations described above with reverence to any of FIGS. 2-9 and/or Equations 1-15, for example.

Figure 11:
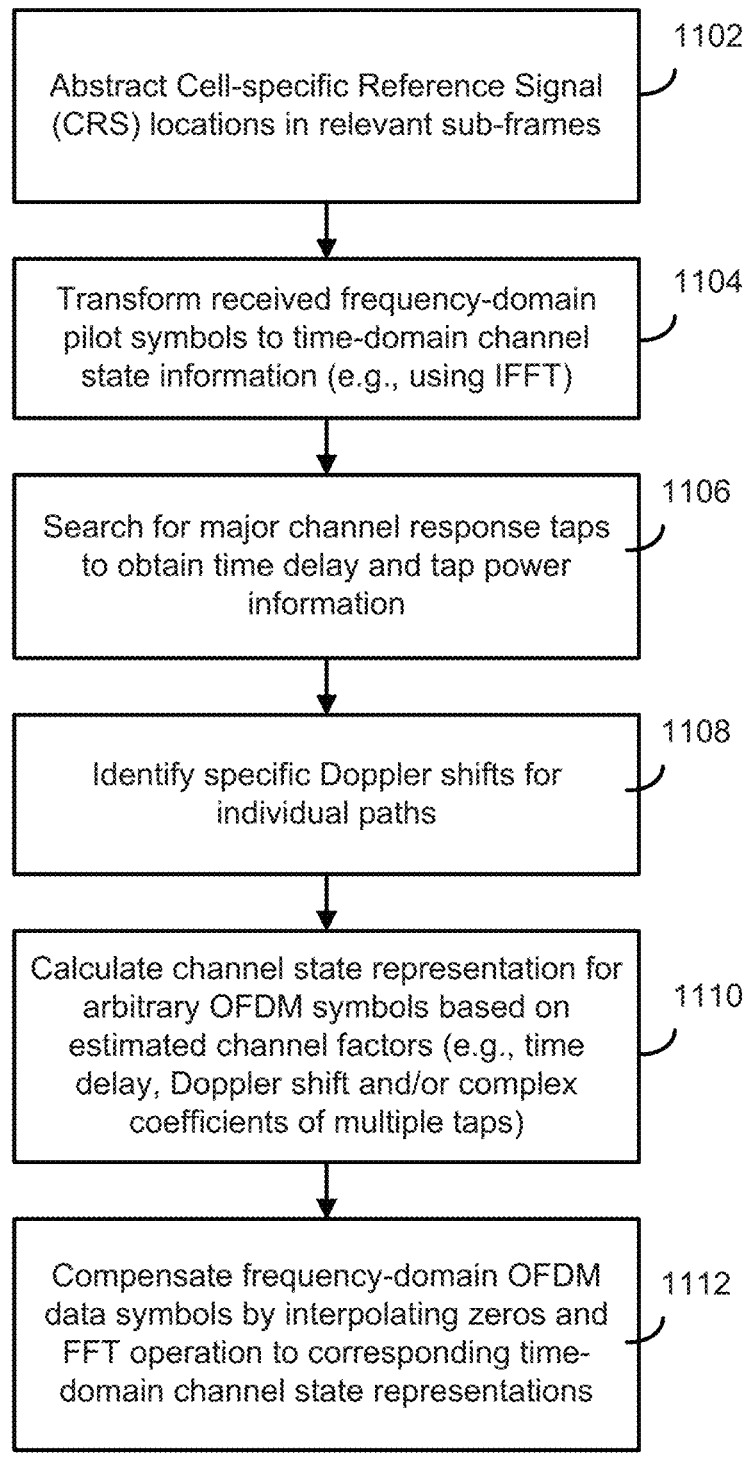
FIG. 11 is a flowchart describing another embodiment of operations of a UE that may be carried on an HST in accordance with some embodiments.

FIG. 11 is a flowchart 1100 describing another embodiment of operations of a UE that may be carried on HST 110 in accordance with some embodiments of channel estimation and compensation, for example.

At 1102, CRS locations in relevant sub-frames may be determined or abstracted, from which frequency-domain pilot symbols may be determined.

At 1104, received frequency-domain pilot symbols may be transformed to time-domain channel state information. In embodiments, frequency-domain pilot symbols may be transformed to time-domain channel state information by IFFT.

At 1106, major channel response taps may be searched to obtain time delay and tap power information. Embodiments may include identifying and/or selecting major signal peaks from among clusters of signal peaks.

At 1108, Doppler shifts may be determined for individual paths. Embodiments may employ MMSE and/or operations that employ any of Eqs. 4/5, 9, and/or 15, for example.

At 1110, channel state representations (e.g., CIRs) for arbitrary OFDM symbols may be determined based on estimated channel factors which, in embodiments, may include determination of time delay, Doppler shift and/or complex coefficients of multiple taps.

At 1112, frequency-domain OFDM data symbols may be compensated. In embodiments, compensation may include interpolating zeros and performing FFT operation to corresponding time-domain channel state representations.

In other embodiments, the channel estimation/compensation described hereinabove may also be applied to channel circumstances in which the time-domain CIR may have countable taps, such as three-path channels with a line-of-sight (LOS) channel that has a very strong dominant path. Such channel circumstances may be sufficiently similar to a single path scenario as to benefit from the channel estimation/compensation described above. Countable taps may refer to a number of taps that is less than 10, and three-path channels with a line-of-sight (LOS) channel may arise, for example when there are three RRHs nearby and a train can receive three copies of transmitted signals from the three RRHs.

In still other embodiments, network assistance may be adopted or provided to identify explicitly the HST scenario and/or SFN scenario for UEs. For example, a base station 130 and/or RRHs 120 may send a signal to UEs to indicate that they are entering and/or leaving an area or region with an HST scenario and/or an SFN scenario.

Figure 12:
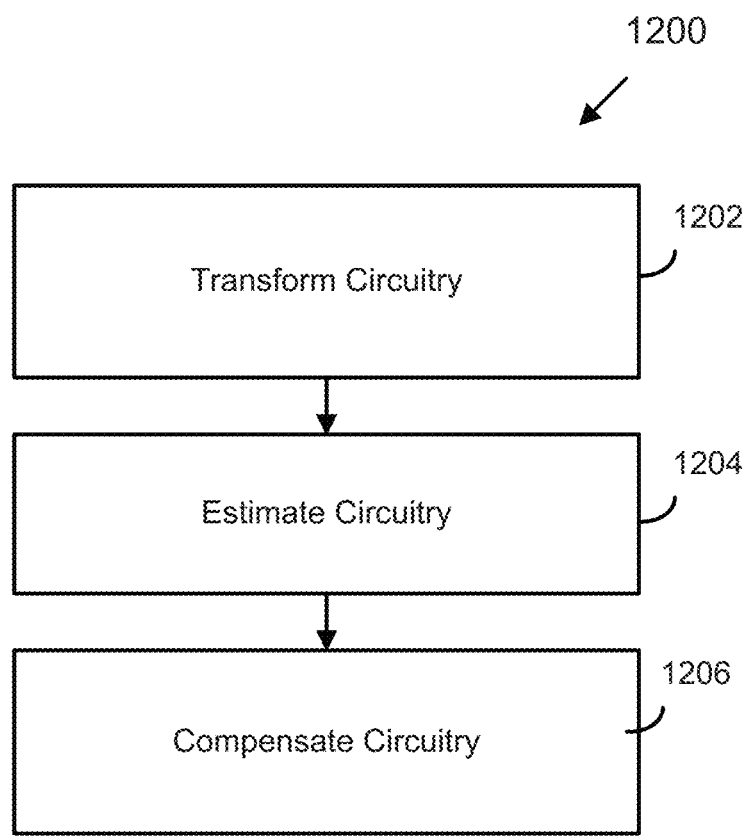
FIG. 12 is a functional block diagram illustrating an embodiment of an apparatus that may perform estimation and/or compensation operations described herein in accordance with some embodiments.

FIG. 12 is a functional block diagram illustrating an embodiment of an apparatus 1200 that may perform estimation and/or compensation operations described herein above. For example, apparatus 1200 may include transform circuitry 1202, which may transform frequency-domain pilot symbols, received in cell-specific reference signal (CRS) locations within one or more sub-frames, to time-domain channel state information. Estimate circuitry 1204 may determine channel time difference characteristics from the time-domain channel state information and determine periodically whether the channel time difference characteristics exceed a threshold. Compensate circuitry 1206 may compensate frequency domain data symbols according to the channel time difference characteristics, if the channel time difference characteristics exceed the threshold.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
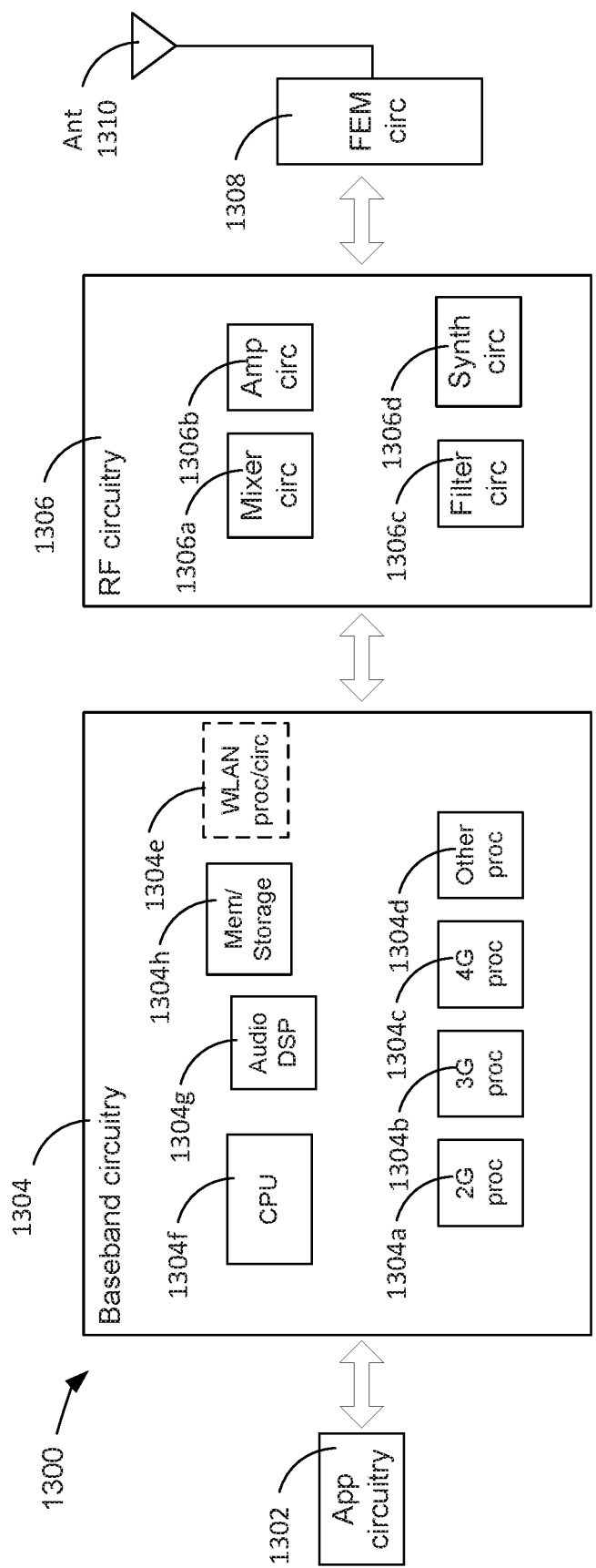
FIG. 13 illustrates example components of an electronic device that may be, implement, be incorporated into, or otherwise be a part of a UE, an eNB, or some other suitable electronic device in accordance with some embodiments.

Embodiments described herein may be implemented into a system using any suitably configured hardware and/or software. FIG. 13 illustrates, for one embodiment, example components of an electronic device 1300. In embodiments, the electronic device 1300 may be, implement, be incorporated into, or otherwise be a part of a UE, an eNB, or some other suitable electronic device. For example, electronic device 1300 may implement, be incorporated into, or otherwise be a part of a UE that may include and/or implement the functions of transform circuitry 1202, estimate circuitry 1204, and compensate circuitry 1206 of apparatus 1200.

In some embodiments, the electronic device 1300 may include application circuitry 1302, baseband circuitry 1304, radio frequency (RF) circuitry 1306, front-end module (FEM) circuitry 1308 and one or more antennas 1310, coupled together at least as shown. The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a second generation (2G) cellular baseband processor 1304a, third generation (3G) cellular baseband processor 1304b, fourth generation (4G) cellular baseband processor 1304c, and/or other cellular baseband processor(s) 1304d for other existing generations, generations in development or to be developed in the future (e.g., fifth generation (5G), 6G, etc.). In embodiments, the electronic device 1300 may implement, be incorporated into, or otherwise be a part of a UE that may include a WLAN (e.g., Wi-Fi) baseband processor or circuitry 1304e. The baseband circuitry 1304 (e.g., one or more of cellular baseband processors 1304a-d and, in embodiments, a WLAN baseband processor 1304e) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304f of the baseband circuitry 1304 may be configured to run elements of the protocol stack for signaling of the PHY, MAC, RLC, PDCP and/or RRC layers. In some embodiments, the baseband circuitry 1304 may include one or more audio digital signal processor(s) (DSP) 1304g. The audio DSP(s) 1304g may be include elements for compression/decompression and echo cancellation and may include other suitable processing elements in other embodiments.

The baseband circuitry 1304 may further include memory/storage 1304h. The memory/storage 1304h may be used to load and store data and/or instructions for operations performed by the processors of the baseband circuitry 1304. Memory/storage for one embodiment may include any combination of suitable volatile memory and/or non-volatile memory. The memory/storage 1304h may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1304h may be shared among the various processors or dedicated to particular processors.

Components of the baseband circuitry 1304 may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the embodiments is not limited in this respect.

In some embodiments, the mixer circuitry 1306a of the receive signal path and the mixer circuitry 1306a of the transmit signal path may include two or more mixers and may be arranged for quadrature downconversion and/or upconversion respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a of the transmit signal path may be arranged for direct downconversion and/or direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry 1308 may include a receive signal path and a transmit signal path. The receive signal path of the FEM circuitry 1308 may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310.

In some embodiments, the electronic device 1300 may include additional elements such as, for example, memory/storage, display, camera, sensor, and/or input/output (I/O) interface.

In some embodiments, the electronic device 1300 may be configured to perform one or more methods, processes, and/or techniques, or one or more portions thereof, as described herein.

Some Non-Limiting Examples are Provided Below

Example 1 may include an apparatus, which may comprise transform circuitry to transform frequency-domain pilot symbols, received in cell-specific reference signal (CRS) locations within one or more sub-frames, to time-domain channel state information; estimate circuitry to determine channel time difference characteristics from the time-domain channel state information and determine periodically whether the channel time difference characteristics exceed a threshold; and compensate circuitry to compensate frequency domain data symbols according to the channel time difference characteristics, if the channel time difference characteristics exceed the threshold.

Example 2 may include the apparatus of example 1, and/or any other example herein, wherein the transform circuitry includes an inverse fast Fourier transformer (IFFT).

Example 3 may include the apparatus of examples 1 or 2, and/or any other example herein, wherein the channel time difference characteristics include a Doppler shift within the one or more sub-frames.

Example 4 may include the apparatus of example 3, and/or any other example herein, wherein the threshold includes substantially opposite first and second Doppler shifts of a selected threshold.

Example 5 may include the apparatus of examples 1 or 2, and/or any other example herein, wherein to determine the channel time difference characteristics includes a determination of a time delay within the one or more sub-frames.

Example 6 may include the apparatus of examples 1 or 2, and/or any other example herein, wherein to determine the channel time difference characteristics includes a determination of a tap power within the one or more sub-frames.

Example 7 may include the apparatus of examples 1 or 2, and/or any other example herein, wherein to compensate frequency domain data symbols according to the channel time difference characteristics includes a fast Fourier transform (FFT) of time-domain channel state representations corresponding to the frequency domain data symbols.

Example 8 may include the apparatus of examples 1 or 2, and/or any other example herein, wherein the channel time difference characteristics exceed the threshold in correspondence with the device being in travel motion at greater than a threshold travel velocity.

Example 9 may include the apparatus of example 8, and/or any other example herein, wherein the threshold travel velocity is 200 kph.

Example 10 may include the apparatus of example 9, and/or any other example herein, wherein the travel velocity corresponds to travel provided by a high speed train (HST).

Example 11 may include the apparatus of example 10, and/or any other example herein, wherein the transform circuitry is to transform frequency-domain pilot symbols to time-domain channel state information in response to an indication received from a network node that the apparatus is in an HST region.

Example 12 may include the apparatus of example 1, and/or any other example herein, wherein the apparatus is included in a user equipment.

Example 13 may include one or more computer-readable media having instructions stored thereon, wherein the instructions, in response to execution by a device, may cause the device to: obtain frequency-domain pilot symbols from cell-specific reference signal (CRS) locations within one or more sub-frames; transform the frequency-domain pilot symbols to time-domain channel state information by inverse fast Fourier transform (IFFT); determine Doppler shift characteristics from the time-domain channel state information and whether the Doppler shift characteristics exceed a threshold; and compensate frequency domain data symbols according to the Doppler shift characteristics, if the Doppler shift characteristics exceed the threshold.

Example 14 may include the one or more computer-readable media of example 13, and/or any other example herein, wherein to determine the channel time difference characteristics includes a determination of a Doppler shift within the one or more sub-frames.

Example 15 may include the one or more computer-readable media of examples 13 or 14, and/or any other example herein, wherein to determine whether the channel time difference characteristics meet a threshold includes a determination whether the Doppler shift within the one or more sub-frames includes substantially opposite first and second Doppler shifts of a selected threshold.

Example 16 may include the one or more computer-readable media of examples 13 or 14, and/or any other example herein, further including instructions to determine a tap power within the one or more sub-frames and to use the tap power to determine the Doppler shift characteristics.

Example 17 may include the one or more computer-readable media of examples 13 or 14, and/or any other example herein, wherein to compensate frequency domain data symbols according to the channel time difference characteristics includes a fast Fourier transform (FFT) of time-domain channel state representations corresponding to the frequency domain data symbols.

Example 18 may include the one or more computer-readable media of examples 13 or 14, and/or any other example herein, further including periodically determining the Doppler shift characteristics within the one or more sub-frames and whether the Doppler shift characteristics exceed the threshold.

Example 19 may include the one or more computer-readable media of examples 13 or 14, and/or any other example herein, wherein the Doppler shift characteristics exceed the threshold in correspondence with the device being in travel motion at greater than a threshold travel velocity.

Example 20 may include the one or more computer-readable media of example 19, and/or any other example herein, wherein the threshold travel velocity is 200 kph.

Example 21 may include the one or more computer-readable media of example 20, and/or any other example herein, wherein the travel velocity corresponds to travel provided by a high speed train (HST).

Example 22 may include the one or more computer-readable media of example 13 or 14, wherein the one or more computer-readable media are included in a user equipment.

Example 23 may include an apparatus, which may comprise: transform circuitry to transform frequency-domain pilot symbols received from cell-specific reference signal (CRS) locations within one or more sub-frames, to time-domain channel state information; estimate circuitry to identify from the time-domain channel state information whether a high speed travel condition exceeds a threshold travel velocity; and compensate circuitry to compensate frequency domain data symbols for the high speed travel condition while the high speed travel condition exceeds the threshold travel velocity.

Example 24 may include the apparatus of example 23, and/or any other example herein, wherein the transform circuitry is further to transform the frequency-domain pilot symbols to time-domain channel state information by inverse fast Fourier transform (IFFT).

Example 25 may include the apparatus of examples 23 or 24, and/or any other example herein, wherein to identify whether the high speed travel condition exceeds the threshold travel velocity includes identification of substantially opposite first and second Doppler shifts of a selected threshold.

Example 26 may include the apparatus of examples 23 or 24, and/or any other example herein, wherein to compensate frequency domain data symbols for the high speed travel condition includes a fast Fourier transform (FFT) of time-domain channel state representations corresponding to frequency domain data symbols.

Example 27 may include the apparatus of examples 23 or 24, and/or any other example herein, wherein the high speed travel condition corresponds to the apparatus being in travel motion at greater than a threshold travel velocity 200 kph.

Example 28 may include the apparatus of example 27, and/or any other example herein, wherein the travel motion corresponds to travel provided by a high speed train (HST).

Example 29 may include the apparatus of examples 23 or 24, and/or any other example herein, wherein the apparatus is included in a user equipment.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. An apparatus, comprising:
    transform circuitry to transform frequency-domain pilot symbols, received in cell-specific reference signal (CRS) locations within one or more sub-frames, to time-domain channel state information;
    estimate circuitry to determine channel time difference characteristics from the time-domain channel state information and determine periodically whether the channel time difference characteristics exceed a threshold, wherein the channel time difference characteristics include first and second Doppler shifts within the one or more sub-frames and the estimate circuitry is further to determine, based on whether the first and second Doppler shifts are substantially opposite, whether the channel time difference characteristics fit a two-path channel model; and
    compensate circuitry to compensate frequency domain data symbols according to the channel time difference characteristics, if the channel time difference characteristics exceed the threshold and fit the two-path channel model.

2. The apparatus of claim 1, wherein the transform circuitry includes an inverse fast Fourier transformer (IFFT).

3. The apparatus of claim 1, wherein to determine the channel time difference characteristics includes a determination of a time delay within the one or more sub-frames.

4. The apparatus of claim 1, wherein to compensate frequency domain data symbols according to the channel time difference characteristics includes a fast Fourier transform (FFT) of time-domain channel state representations corresponding to the frequency domain data symbols.

5. The apparatus of claim 1, wherein the channel time difference characteristics exceed the threshold in correspondence with the apparatus being in travel motion at greater than a threshold travel velocity.

6. The apparatus of claim 5, wherein the threshold travel velocity is 200 kph.

7. The apparatus of claim 6, wherein the travel motion corresponds to travel provided by a high speed train (HST).

8. The apparatus of claim 7, wherein the transform circuitry is to transform the frequency-domain pilot symbols to the time-domain channel state information in response to an indication received from a network node that the apparatus is in an HST region.

9. The apparatus of claim 1, wherein the apparatus is included in a user equipment.

10. One or more non-transitory, computer-readable media having instructions stored thereon, wherein the instructions, in response to execution by a device, cause the device to:
    obtain frequency-domain pilot symbols from cell-specific reference signal (CRS) locations within one or more sub-frames;
    transform the frequency-domain pilot symbols to time-domain channel state information by inverse fast Fourier transform (IFFT);
    determine Doppler shift characteristics from the time-domain channel state information, the Doppler shift characteristics to include first and second Doppler shifts within the one or more sub-frames;
    determine whether the Doppler shifts exceed one or more thresholds;

determine whether the Doppler shifts are substantially opposite;

determine whether the Doppler shift characteristics fits a two-path channel model based on said determination of whether the Doppler shifts exceed one or more thresholds and are substantially opposite; and compensate frequency domain data symbols according to the Doppler shift characteristics, if the Doppler shift characteristics fit the two-path channel model.

11. The one or more non-transitory, computer-readable media of claim 10, wherein the instructions, when executed, further cause the device to determine the device is traveling with a velocity over a predetermined threshold if the first and second Doppler shifts are determined to be substantially opposite and are determined to exceed the one or more thresholds.

12. The one or more non-transitory, computer-readable media of claim 10, further including instructions to determine a tap power within the one or more sub-frames and to use the tap power to determine the Doppler shift characteristics.

13. The one or more non-transitory, computer-readable media of claim 10, wherein to compensate frequency domain data symbols according to the Doppler shift characteristics includes a fast Fourier transform (FFT) of time-domain channel state representations corresponding to the frequency domain data symbols.

14. The one or more non-transitory, computer-readable media of claim 10, further including periodically determining the Doppler shift characteristics within the one or more sub-frames and whether the Doppler shift characteristics exceed the one or more thresholds.

15. The one or more non-transitory, computer-readable media of claim 10, wherein the Doppler shift characteristics exceed the one or more thresholds in correspondence with the device being in travel motion at greater than a threshold travel velocity.

16. The one or more non-transitory, computer-readable media of claim 15, wherein the travel motion corresponds to travel provided by a high speed train (HST).

17. The one or more non-transitory, computer-readable media of claim 10, wherein the one or more computer-readable media are included in a user equipment.

18. One or more non-transitory, computer-readable media having instructions that, when executed by one or more processors of a device, cause the device to:

determine a first plurality of Doppler shifts, detected within a first time period, are consistent with multipath fading channels;

estimate a first Doppler spread using a first estimation process based on said determination that the first plurality of Doppler shifts are consistent with multipath fading channels;

determine first and second Doppler shifts of a second plurality of Doppler shifts, detected within a second time period, are substantially opposite and exceed one or more thresholds;

determine the second plurality of Doppler shifts are consistent with a two-path model based on said determination that the first and second Doppler shifts are substantially opposite and exceed the one or more thresholds;

estimate a second Doppler spread using a second estimation process based on said determination that the second plurality of Doppler shifts are consistent with the two-path model; and compensate for the first Doppler spread in signals received within the first time period and the second Doppler spread in signals received within the second time period.

19. The one or more non-transitory, computer-readable media of claim 18, wherein the instructions, when executed by the one or more processors, further cause the device to: transform frequency-domain pilot symbols received within subframes with cell-specific reference signal locations, to time-domain channel state representations; and determine the first and second Doppler shifts based on the time-domain channel state representations.

20. The one or more non-transitory, computer-readable media of claim 18, wherein the first estimation process is based on a minimum-mean-squared error linear Wiener filter.

* * * * *